(12) United States Patent
Kim (10) Patent No.: US 6,714,492 B2
(45) Date of Patent: Mar. 30, 2004

(54) OPTICAL DISC PLAYER FOR COMPENSATING FOR ECCENTRICITY ERROR WITH ECCENTRICITY DETECTED AND COMPENSATED AT DIFFERENT PARTS OF THE PLAYER

(75) Inventor: Jeong-hun Kim, Bucheon (KR)

(73) Assignee: Samsung Electronics Co., Ltd. (KR)

( * ) Notice: Subject to any disclaimer, the term of this patent is extended or adjusted under 35 U.S.C. 154(b) by 124 days.

(21) Appl. No.: 09/994,350

(22) Filed: Nov. 26, 2001

(65) Prior Publication Data

US 2002/0141303 A1 Oct. 3, 2002

(30) Foreign Application Priority Data

Mar. 30, 2001 (KR) ........................................ 2001-16870

(51) Int. Cl.[7] .............................................. G11B 7/095
(52) U.S. Cl. ............................. 369/44.32; 369/44.35; 369/53.14; 369/53.3; 360/77.03
(58) Field of Search ...................... 369/44.35, 44.25, 369/44.32, 53.14, 53.3; 360/77.03

(56) References Cited

U.S. PATENT DOCUMENTS

| | | | | |
|---|---|---|---|---|
| 4,365,324 A | * | 12/1982 | Michaelis | .................... 369/44 |
| 4,498,110 A | * | 2/1985 | Kimura | ..................... 358/342 |
| 4,819,221 A | * | 4/1989 | Overrath et al. | ............... 369/50 |
| 5,042,021 A | * | 8/1991 | Nagano et al. | .......... 369/44.32 |
| 5,526,332 A | * | 6/1996 | Yamada et al. | ................ 369/48 |
| 5,528,020 A | * | 6/1996 | Dickens et al. | ............... 369/50 |

FOREIGN PATENT DOCUMENTS

| | | | |
|---|---|---|---|
| JP | 5-197987 | 8/1993 | .......... G11B/7/095 |
| KR | 00-0045545 | 7/1925 | .......... G11B/7/095 |

* cited by examiner

Primary Examiner—Gautan R. Patel
(74) Attorney, Agent, or Firm—Mills & Onello LLP

(57) ABSTRACT

An optical disc player, which compensates for an eccentricity, is provided including: a spindle controller, a pickup, an RM amplifier, a focusing servo, a tracking servo and an eccentricity compensator. The spindle controller rotates an optical disc. The pickup has a focusing actuator and a tracking actuator and reads information on the optical disc. The RF amplifier detects and amplifies a focusing error signal and a tracking error signal from information on the optical disc obtained from the pickup. The focusing servo controls the focusing actuator in response to the amplified focusing error signal. The tracking servo outputs a tracking control signal in response to the amplified tracking error signal. The eccentricity compensator outputs a signal which compensates for the eccentricity of an optical disc in response to the output signal of the spindle controller, the amplified tracking error signal and the amplified tracking control signal. The eccentricity compensator detects the rotation period of the optical disc, produces a plurality of pulses using the detected rotation period, detects an eccentricity included in the amplified tracking error signal according to the plurality of generated pulses and generates a compensating signal for the detected eccentricity. The compensating signal automatically changes in relation to the playback speed of the optical disc.

3 Claims, 7 Drawing Sheets

OPTICAL DISC PLAYER FOR COMPENSATING FOR ECCENTRICITY ERROR WITH ECCENTRICITY DETECTED AND COMPENSATED AT DIFFERENT PARTS OF THE PLAYER

BACKGROUND OF THE INVENTION

1. Field of the Invention

The present invention relates to an optical disc player, and more particularly, to an optical disc player which compensates for eccentricity components regardless of the playback speed of an optical disc.

2. Description of the Related Art

Generally, compact disc players (CDP) or digital video disc players (DVDP) emit laser on the track of a disc, pick up a reflected ray and read information contained in the reflected ray that has been picked up. The disc has a plurality of spiral tracks, and pits having information data are contained in each track. The laser reads the information while following the spiral tracks.

Eccentricity may result in the event that the tracks are not manufactured in the structure of a concentric circle or if the central axis of a spindle motor rotating the disc is altered. A laser beam may deviate from the tracks when following the tracks to read information if the eccentricity deviates from the error tolerance range of an optical disc player.

Figure 1:
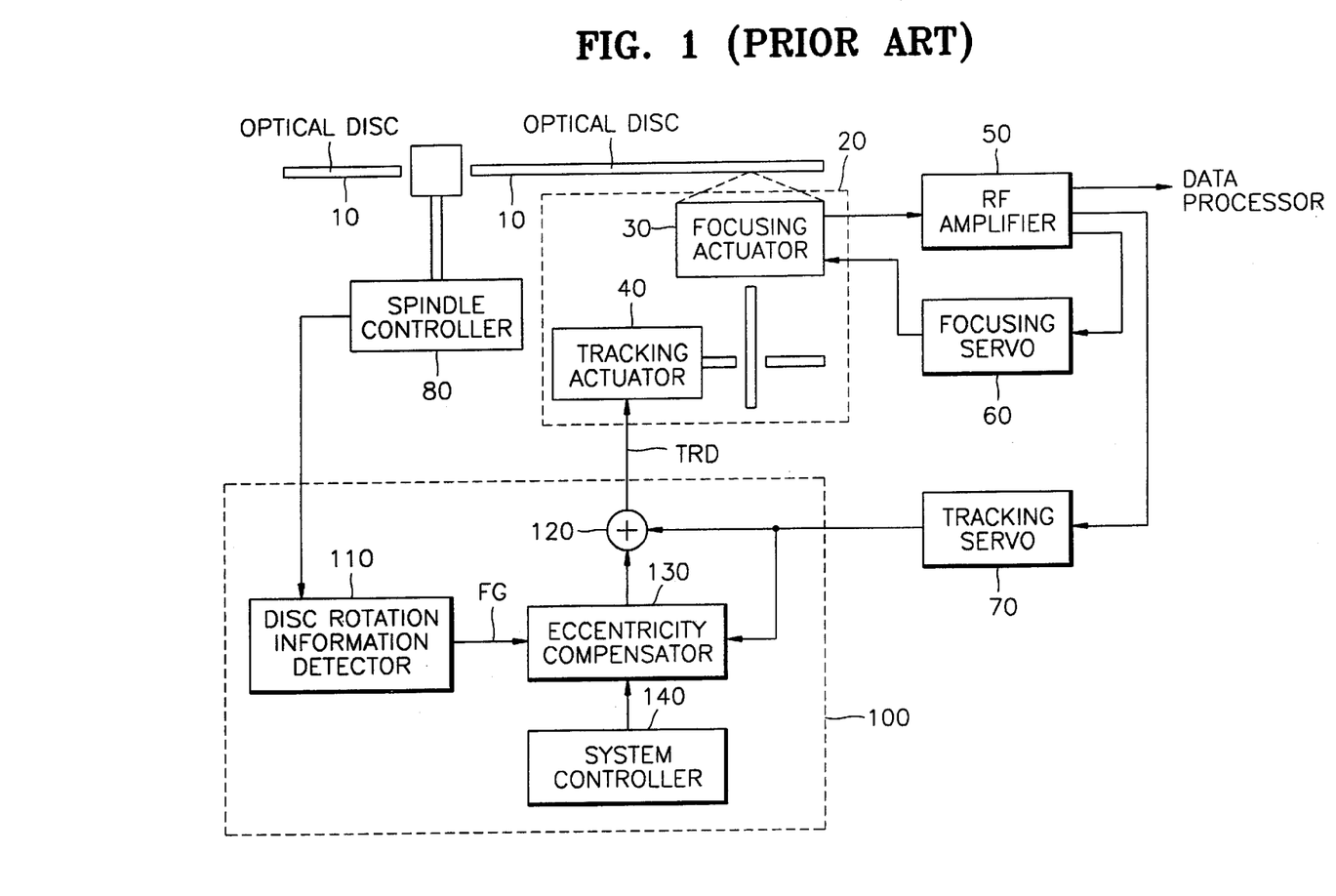
FIG. 1 contains a block diagram of an example of a conventional optical disc player.

FIG. 1 shows an example of a conventional optical disc player. Referring to FIG. 1, the conventional optical disc player includes an optical disc 10, a pickup 20, a radio frequency (RF) amplifier 50, a focusing servo 60, a tracking servo 70, a spindle controller 80 and a compensating circuit 100.

Figure 2:
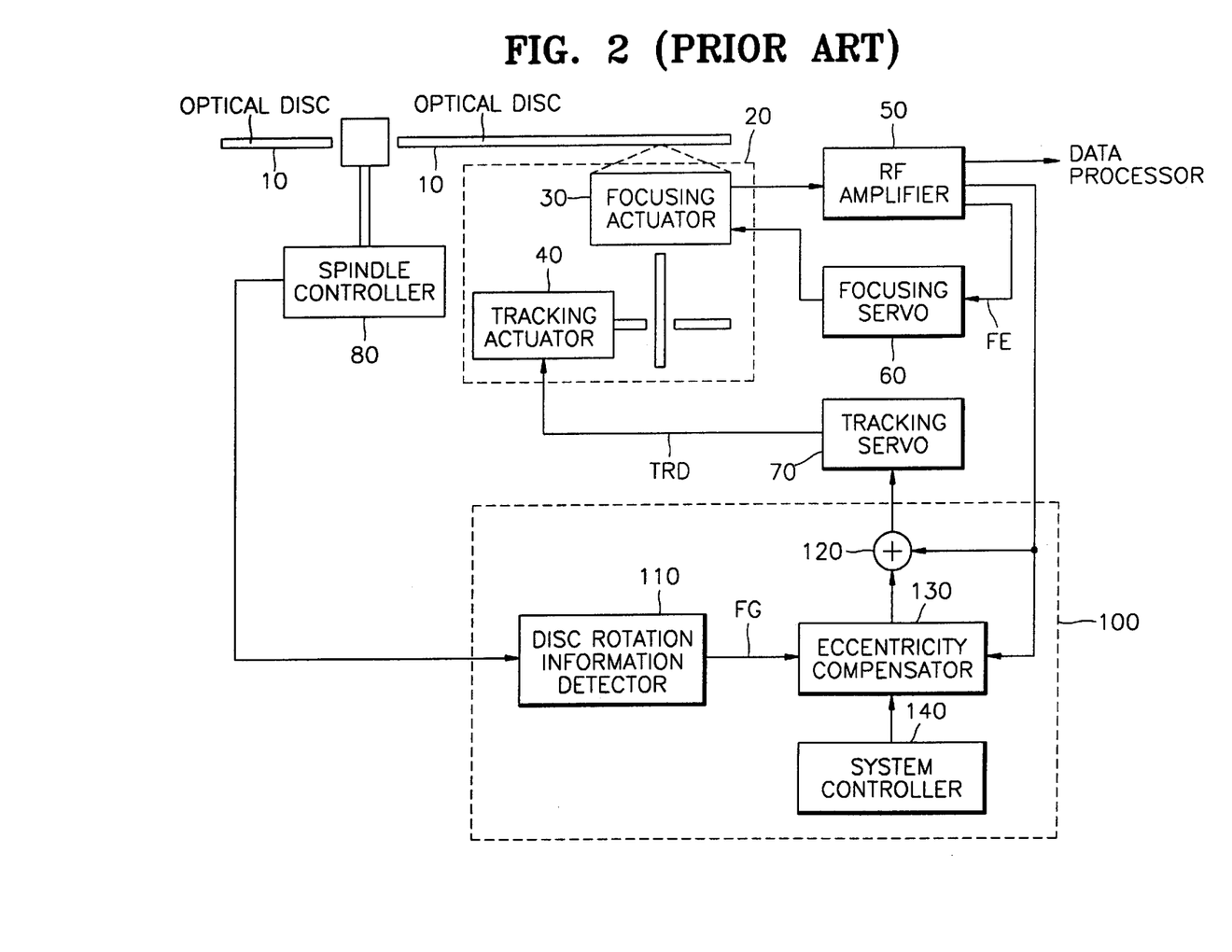
FIG. 2 contains a block diagram of another example of a conventional optical disc player.

FIG. 2 shows another example of a conventional optical disc player. Referring to FIG. 2, the conventional optical disc player includes the optical disc 10, the pickup 20, the RF amplifier 50, the focusing servo 60, the tracking servo 70, the spindle controller 80 and the compensating circuit 100.

Eccentricity compensation in the conventional optical disc players is performed in accordance with the following. In FIG. 1, an eccentricity compensator 130 detects an eccentricity from the output signal of the tracking servo 70, and an adder 120 combines the output signal of the tracking servo 70 with a signal which compensates for the detected eccentricity. The signal output from the adder 120, i.e., the signal compensated for the eccentricity, controls a tracking actuator 40 in the pickup 20.

In FIG. 2, the eccentricity compensator 130 extracts an eccentricity from the output signal of the RF amplifier 50, and the output signal of the RF amplifier 50 is combined in the adder 120 with a signal from the eccentricity compensator 130 which compensates for the eccentricity. The signal output in the adder 120, i.e., the signal compensated for the eccentricity, controls the tracking actuator 40 in the pickup 20, via the tracking servo 70.

The conventional optical disc players shown in FIGS. 1 and 2 compensate for the eccentricity at the very place where the eccentricity is extracted, i.e., the output end of the tracking servo 70 (FIG. 1) and the output end of the RF amplifier 50 (FIG. 2).

A tracking filter (not shown), which is one of the elements constituting the tracking servo 70, outputs a signal having a phase delay. In the case of FIG. 1, the compensating circuit 100 has a disadvantage in that a phase delay included in an extracted eccentricity in the tracking filter must be considered. In FIG. 2, a signal, which is compensated in the compensating circuit 100 and then is transferred to the tracking actuator 40 via the tracking servo 70, causes phase delay when passing through the tracking servo 70, which results in incorrect eccentricity compensation.

Figure 3:
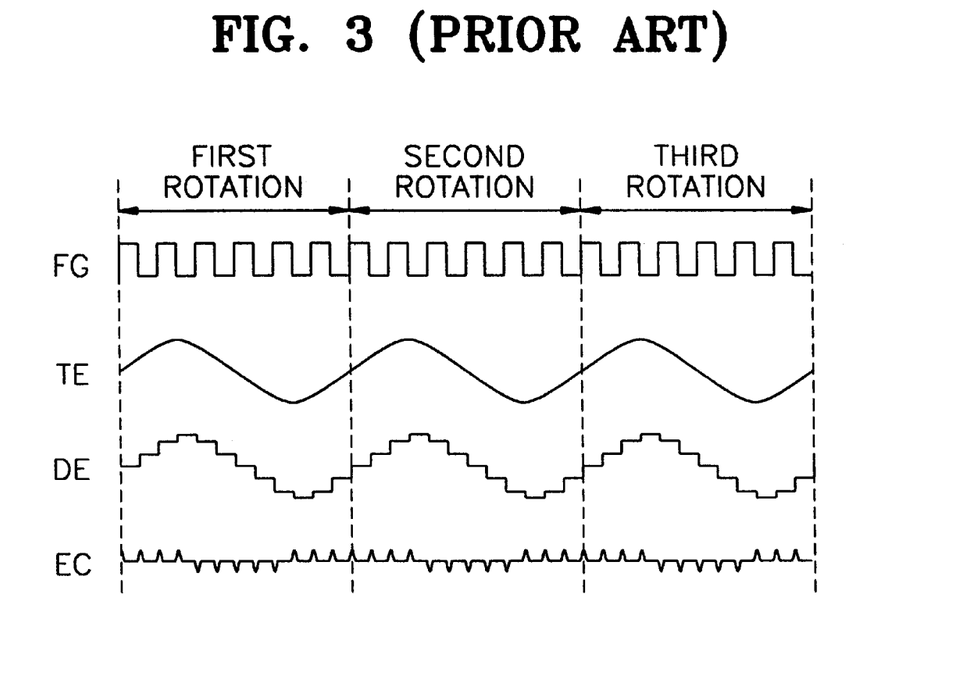
FIG. 3 is a waveform diagram illustrating signals related to eccentricity compensation in a conventional optical disc player.

FIG. 3 is a waveform diagram of signals related to eccentricity compensation in a conventional optical disc player. As can be seen in FIG. 3, a signal FG is the output signal of a disc rotation information detector 110, a signal TE is an actual eccentricity which is input into the eccentricity compensator 130 from the tracking servo 70 or the RF amplifier 50, a signal DE is an eccentricity extracted in accordance with the edge of the signal FG in the eccentricity compensator 130 and a signal EC which is compensated for eccentricity is the output signal of the adder 120.

In FIG. 3, the eccentricity compensation rendered in a conventional optical disc player compensates for eccentricity during the subsequent rotation of an optical disc by extracting eccentricity included in the output of the RF amplifier 50 or the tracking servo 70 at the edge of the output signal FG of the disc rotation information detector 110 and storing the extracted eccentricity in a memory. However, with regard to the compensated signal EC (which is indicated as TRD in FIGS. 1 and 2), the discontinuous points of an eccentricity, i.e., the portions corresponding to the edges of the signal FG, function as a high frequency component in the tracing servo 70 thereby preventing stable operation of the tracking actuator 40.

Figure 4:
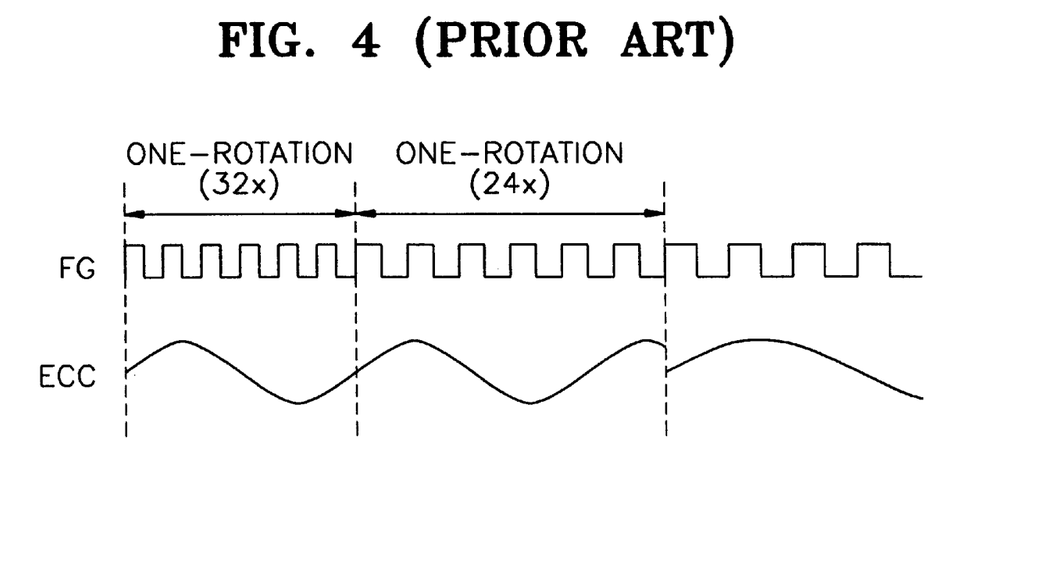
FIG. 4 is a waveform diagram illustrating signals related to eccentricity compensation when changing the playback speed in a conventional optical disc player.

FIG. 4 is a waveform diagram of signals related to eccentricity compensation when changing the playback speed of a disc in a conventional optical disc player. Referring to FIG. 4, the signal FG is the output signal of the disc rotation information detector 110 and a signal ECC is an eccentricity to be compensated for. An eccentricity to be extracted and compensated at 32-times speed is difficult to be correctly compensated at 24-times speed or an even slower section where the eccentricity is too large.

SUMMARY OF THE INVENTION

To solve the above problems, it is an objective of the present invention to provide an optical disc player that solves phase delay by making the positions where an eccentricity error is extracted and compensated for different from each other and includes a pulse signal generator to produce a plurality of pulse signals corresponding to a signal FG changing according to the change of the playback speed of a disc.

Accordingly, to achieve the above objective, there is provided an optical disc player according to the present invention including a spindle controller, a pickup, a radio frequency (RF) amplifier, a focusing servo, a tracking servo and an eccentricity compensator. The spindle controller rotates an optical disc. The pickup has a focusing actuator and a tracking actuator and reads information recorded on the optical disc. The RF amplifier detects and amplifies a focusing error signal and a tracking error signal from information on the optical disc obtained from the pickup. The focusing servo controls the focusing actuator in response to the amplified focusing error signal. The tracking servo outputs a tracking control signal in response to the amplified tracking error signal. The eccentricity compensator outputs a signal which compensates for the eccentricity of an optical disc in response to the output signal of the spindle controller, the amplified tracking error signal and the amplified tracking control signal. The eccentricity compensator detects the rotation period of the optical disc, produces a plurality of pulses using the detected rotation period, detects an eccentricity included in the amplified tracking error signal according to the plurality of generated pulses and generates a compensating signal for the detected eccentricity. Also, the compensating signal automatically changes in relation to the playback speed of the optical disc.

In one embodiment, the eccentricity compensator includes a disc rotation detector, a pulse signal generator, an eccentricity controller, an eccentricity compensator and an adder. The disc rotation detector outputs a series of digital pulses every rotation of the optical disc in response to the output signal of the spindle controller. The pulse signal generator outputs first and second pulse signals in response to the series of digital pulses. The eccentricity controller outputs an eccentricity control signal which indicates whether the eccentricity of the optical disc is to be compensated for. The eccentricity compensator outputs an eccentricity compensation signal in response to the eccentricity control signal, the first pulse signal, the second pulse signal and the amplified tracking error signal. The adder combines the eccentricity compensation signal with the tracking control signal and transmits the combined result to the pickup.

In one embodiment, the first pulse signal is generated at the falling edge and rising edge of the received series of digital pulses, and a plurality of pulses are generated in the second pulse signal for each pulse of the first pulse signal.

In one embodiment, the eccentricity compensator includes a band-pass filer, an eccentricity extraction and compensation unit and a gain/phase controller. The band-pass filter receives the amplified tracking error signal and removes DC components or noise therefrom. The eccentricity extraction and compensation unit extracts and compensates for an eccentricity in response to the first pulse signal, the second pulse signal, the eccentricity control signal and the output signal of the band-pass filter. The gain/phase controller receives the output signal of the eccentricity extraction and compensation unit and regulates the gain of the received signal and the frequency thereof.

In one embodiment, the eccentricity extraction and compensation unit includes a one-rotation detector, a memory controller, a memory and an eccentricity compensation selector. The one-rotation detector outputs a one-rotation flag signal and an eccentricity compensating selection signal in response to the first pulse signal and the eccentricity control signal. The memory controller outputs an address signal and a read/write signal in response to the eccentricity control signal, the second pulse signal and the one-rotation flag signal. The memory stores an eccentricity error which is the output signal of the band-pass filer or outputs the stored eccentricity error in response to the second pulse signal, the address signal and the read/write signal. The eccentricity compensation selector selects the eccentricity error or a predetermined reference value according to the eccentricity compensation selection signal.

The one-rotation detector further receives a mute signal, mutes eccentricity compensation based on the mute signal, and maintains the phase of an eccentricity in preparation for the subsequent compensation.

BRIEF DESCRIPTION OF THE DRAWINGS

The foregoing and other objects, features and advantages of the invention will be apparent from the more particular description of a preferred embodiment of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS OF THE INVENTION

Figure 5:
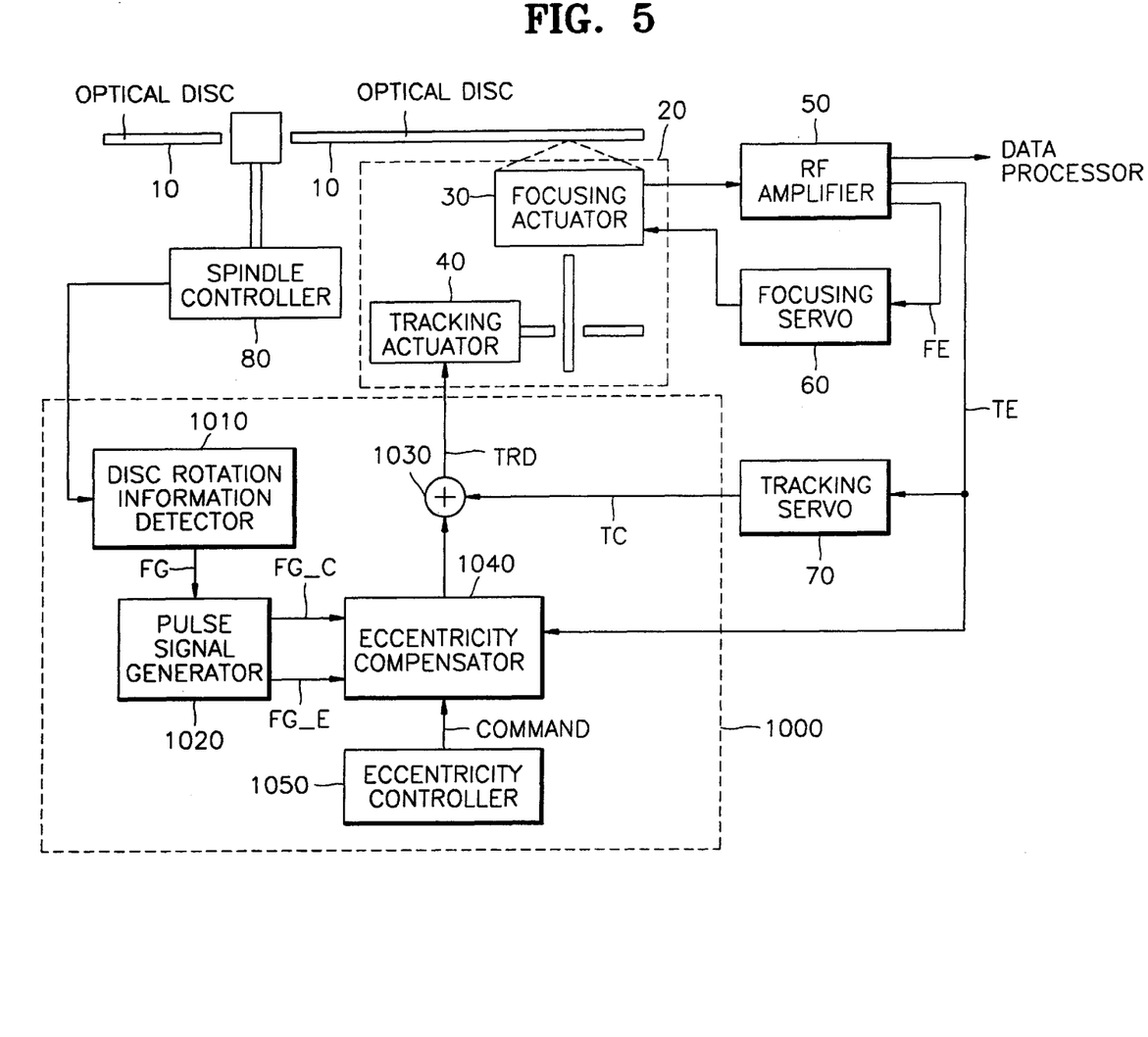
FIG. 5 contains a block diagram of one embodiment of an optical disc player according to the present invention.

FIG. 5 contains a block diagram of one embodiment of an optical disc player according to the present invention. Referring to FIG. 5, the optical disc player according to the present invention includes an optical disc 10, a pickup 20, an RF (Radio Frequency) amplifier 50, a focusing servo 60, a tracking servo 70, a spindle controller 80 and an eccentricity compensator 1000.

The optical disc 10 denotes an optical disc containing data to be played back. The pickup 20 includes a focusing actuator 30 which moves upward or downward with regard to the surface of the optical disc 10 having the data as a basis in order to correctly focus on the optical disc 10 a beam emitted from a laser source (not shown) mounted on the pickup 20. A tracking actuator 40 moves toward or away from the central part of the optical disc 10 so that a beam emitted from the laser source can correctly trace the track of the optical disc 10.

The RF amplifier 50 amplifies the RF signal read from the optical disc 10 via the pickup 20 and generates a focusing error signal FE and a tracking error signal TE. A focusing servo 60 controls the focusing actuator 30 in the pickup 20 in response to the focusing error signal FE of the RF amplifier 50. The tracking servo 70 generates a signal TC which is used to produce a signal TRD which controls the tracking actuator 40 in the pickup 20 in response to the tracking error signal TE of the RF amplifier 50. The spindle controller 80 controls the rotation of the optical disc 10.

The eccentricity compensator 1000 includes a disc rotation information detector 1010, a pulse signal generator 1020, an adder 1030, an eccentricity compensator 1040 and an eccentricity controller 1050.

The disc rotation information detector 1010 outputs a series of digital pulses FG, i.e. a signal made as a result of extracting the rotation of the optical disc 10 from the output signal of the spindle controller 80. The pulse signal generator 1020 outputs a first pulse signal FG_E, and a second pulse signal FG_C using the series of digital pulses FG. An eccentricity controller 1050 outputs an eccentricity control signal COMMAND for controlling the eccentricity compensation of the eccentricity compensator 1040. The eccentricity compensator 1040 extracts an eccentricity included in the amplified tracking error signal TE in response to the eccentricity control signal COMMAND of the eccentricity controller 1050 and the first pulse signal FG_E and the second pulse signal FG_C, and outputs a compensation signal for the extracted eccentricity. The adder 1030 controls the tracking actuator 40 using a signal TRD formed by combining the output signal TE of the tracking servo 70 and the output signal of the eccentricity compensator 1040.

Figure 6:
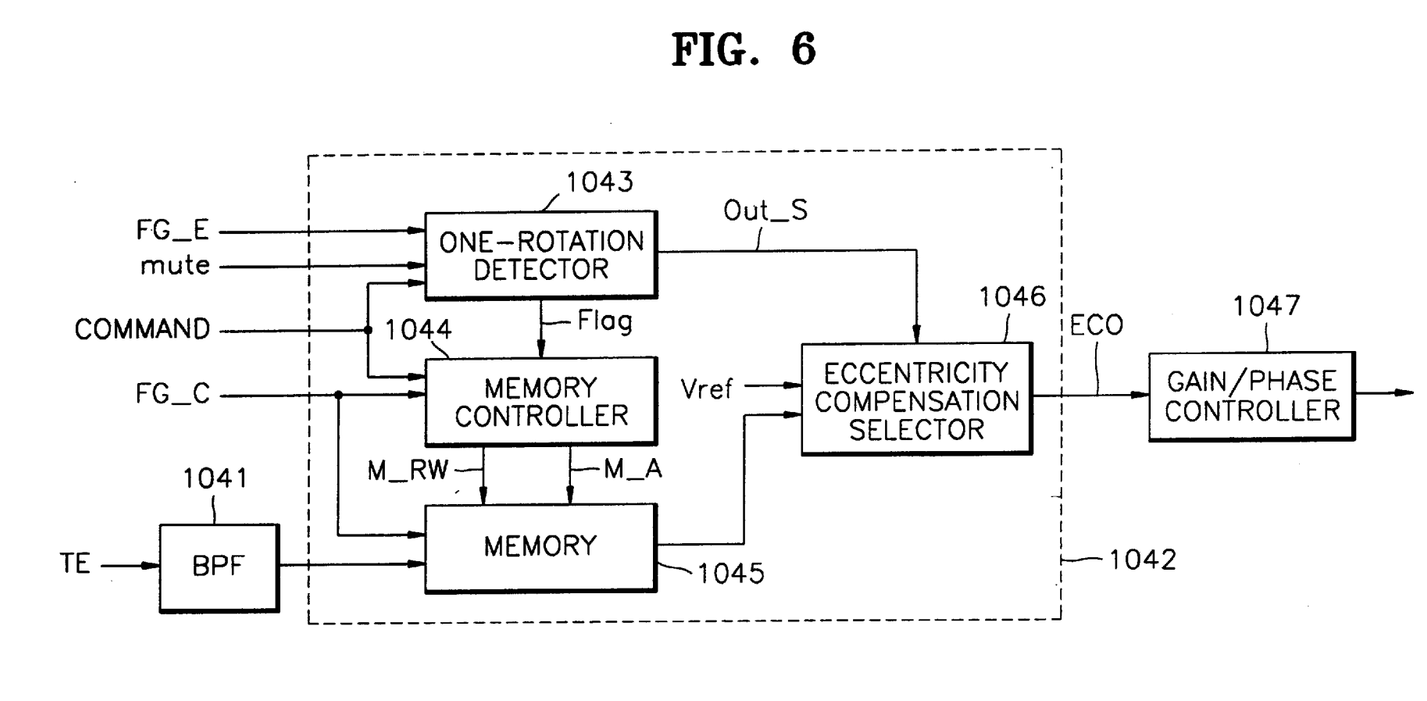
FIG. 6 is a block diagram illustrating the inner portion of an eccentricity compensator shown in FIG. 5.

FIG. 6 is a block diagram of the eccentricity compensator 1040 illustrated in FIG. 5. Referring to FIG. 6, the eccentricity compensator 1040 includes a band-pass filter 1041, an eccentricity extraction and compensation unit 1042 and a gain/phase controller 1047.

The band-pass filter 1041 receives the amplified tracking error signal TE and removes DC components or noises therefrom. The eccentricity extraction and compensation unit 1042 extracts and compensates for an eccentricity in response to the first pulse signal FG_E, the second pulse signal FG_C, the eccentricity control signal COMMAND and the output signal of the band-pass filter 1041. The gain/phase controller 1047 receives the output signal ECO of the eccentricity extraction and compensation unit 1042 and compensates for the gain and frequency of the received signal.

The eccentricity extraction and compensation unit 1042 includes a one-rotation detector 1043, a memory controller 1044, a memory 1045 and an eccentricity compensation selector 1046. The one-rotation detector 1043 outputs a one-rotation flag signal and an eccentricity compensation selection signal Out_S in response to the first pulse signal FG_C and the eccentricity control signal COMMAND. The memory controller 1044 outputs an address signal M_A and a read/write signal M_RW in response to the eccentricity control signal COMMAND, the second pulse signal FG_E and the one-rotation flag signal. The memory 1045 stores an eccentricity error, which is a signal output from the band-pass filter 1041, in response to the second pulse signal FG_C, the address signal M-A and the read/write signal M-RW, or outputs the stored eccentricity error. The eccentricity compensation selector 1046 selects the eccentricity error or a predetermined reference value Vref according to the eccentricity compensation selection signal Out_S.

The one-rotation detector 1043 further receives a mute signal, mutes eccentricity compensation in accordance with the mute signal, and maintains the phase of an eccentricity in preparation for the subsequent compensation.

The operation of the optical disc player according to the present invention will be described below.

The optical disc player of the present invention generates a series of digital pulses FG in the disc rotation information detector 1010 in response to the output signal of the spindle controller 80. The pulse signal generator 1020 receives the series of digital pulses FG and outputs the first pulse signal FG_E generated at every falling edge and rising edge of the received the series of digital pulses FG and the second pulse signal FG_C having a plurality of pulses corresponding to every pulse of the first pulse signal FG_C.

Figure 7:
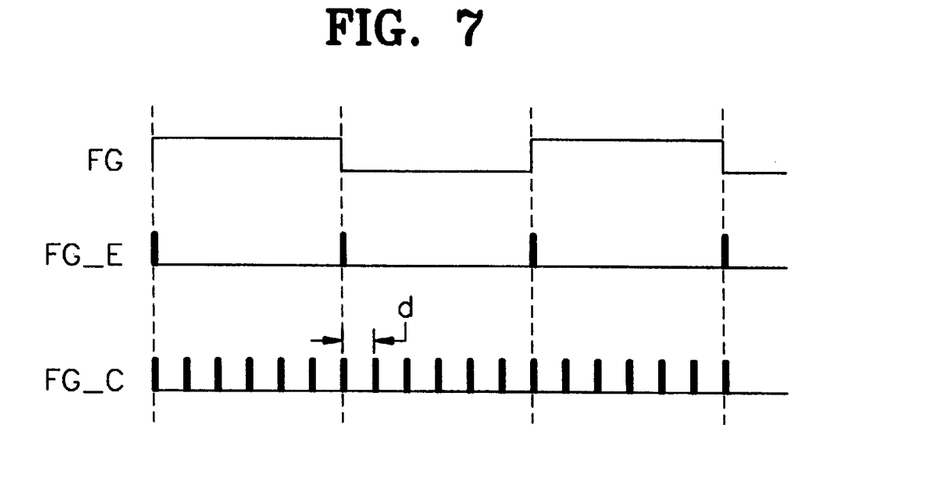
FIG. 7 shows the timing of several signals of a pulse signal generator.

FIG. 7 illustrates the timing of several signals of the pulse signal generator 1020. Referring to FIG. 7, the timing of several signals will be described. The first pulse signal FG_E is made using the edges of the series of digital pulses FG and the width of the first pulse signal FG_E is recorded using a counter (not shown). The width d between adjacent pulses of the second pulse signal FG_C is estimated by dividing a counter number N (N=constant) corresponding to one cycle of the first pulse signal FG_E by a predetermined number of the pulses of the generated second pulse signal FG_C. Accordingly, the width among the first pulse signals FG_E may vary when changing the playback speed of an optical disc player and as a result, the width between the pulses of the second pulse signals FG_C is also changed in accordance with that between the pulses of the first pulse signal FG_E.

In order to avoid any effects due to the phase delay of a tracking filter (not shown) in the tracking servo 70, the extraction and compensation of an eccentricity are made at the output end of the RF amplifier 50 and the output end of the tracking servo 70, respectively. The DC (Direct Current) and noise of the tracking error signal TE, which is detected or amplified in the RF amplifier 50, are removed by the band-pass filter 1041.

At the same time, the eccentricity corresponding to one rotation of an optical disc is sampled according to the eccentricity control signal COMMAND of the eccentricity controller 1050, and the second pulse signal FG_C and then is stored in the memory 1045. One rotation of an optical disc is determined by counting the first pulse signal FG_E, which may vary depending on whether a motor used in an optical disc player is a 6 phase or 12-phase motor. The gain/phase controller 1047 compensates for a gain or phase corresponding to the frequency of the playback speed of an optical disc when eccentricity is extracted, referring to a frequency and gain characteristic curve (not shown, but provided by a manufacturer) of the RF amplifier 50 and the tracking actuator 40.

While changing the playback speed of an optical disc, the gain and phase of an eccentricity according to a playback speed can be properly determined on the basis of the interval of the first pulse signal FG_E of the pulse signal generator 1020. For instance, if an eccentricity is extracted at a 24-times speed, a gain and phase of 80 Hz that is a frequency of the tracking actuator (gain: 75 dB and phase: 150 degrees) become references during the playback of the optical disc at a 24-times speed. In the event that the playback speed of an optical disc increases to a 32×speed, the gain and the phase are altered to be suitable for 100 Hz, which is a frequency (gain: 70 dB and phase: 162 degrees) corresponding to a 32-times speed. Here, it is preferable that the minimum frequency of a changed playback speed be 10 Hz or 5 Hz.

Figure 8:
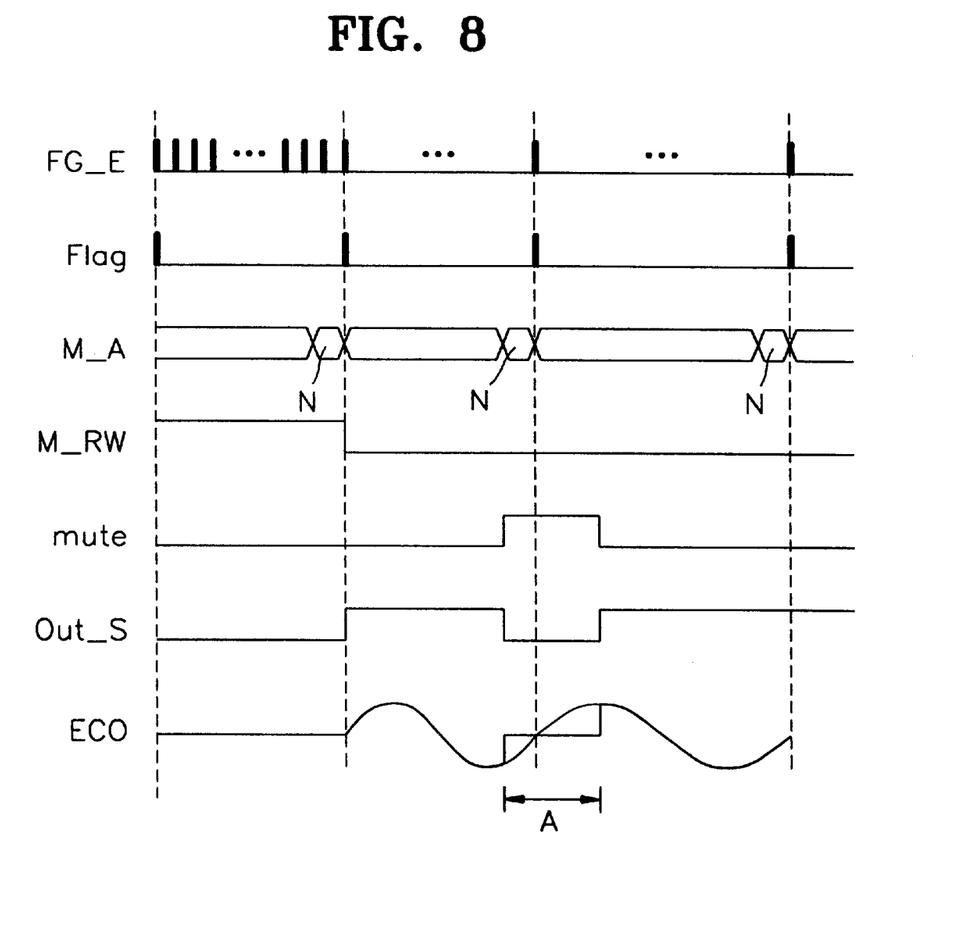
FIG. 8 shows the timing of several signals of an eccentricity extraction and compensation unit.

FIG. 8 shows the timing of several signals of the eccentricity extraction and compensation unit 1042. Referring to FIG. 8, one pulse of a flag signal and pulses of the first pulse signal FG_E are generated for each rotation of the corresponding motor. The stored address of a memory is designated by increasing the address of the memory 1045 in accordance with the one-rotation flag signal and the second pulse signal FG_C which are used for resetting, and an eccentricity is stored in and read from the designated memory when the writing order signal M_RW is high and low, respectively. Storing an eccentricity in the memory in accordance with the memory address M_A and the writing order signal M_RW is always made during the first one-rotation. A constant basis value Vref is selected (A section) or the eccentricity stored in the memory is selected depending on an eccentricity compensation selecting signal determined by a mute signal and an eccentricity control signal COMMAND (not shown), and then the result is transferred to the gain/phase controller.

Figure 9:
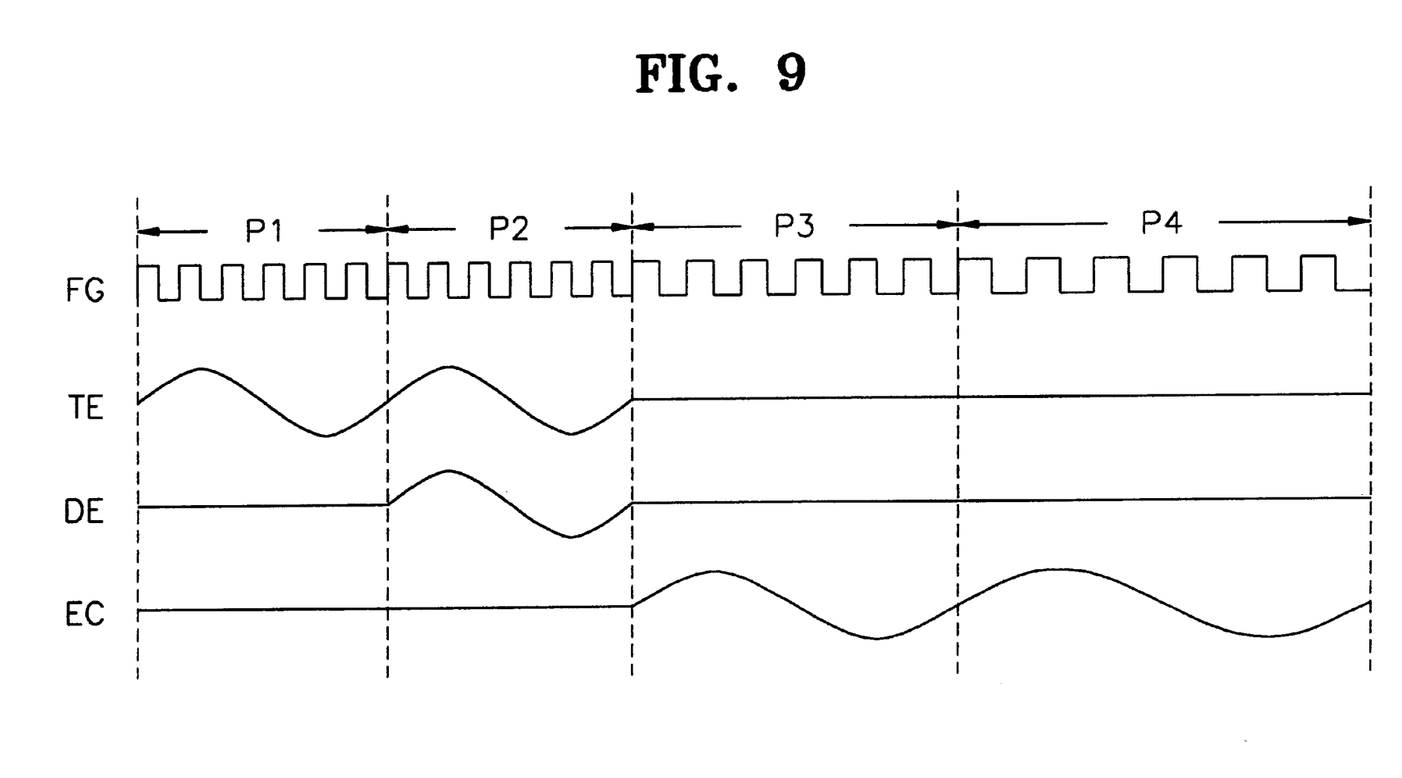
FIG. 9 is a waveform diagram illustrating eccentricity compensation when changing the playback speed of the optical disc player according to the present invention.

FIG. 9 is a waveform diagram illustrating eccentricity compensation when altering the playback speed of the optical disc player according to the present invention. Referring to FIG. 9, section P1 shows the first one rotation, section P2 shows the extraction of an eccentricity, and sections P3 and P4 correspond to different playback speeds of a disc. The playback speeds of sections P3 and P4 are also different from that in section P2, where eccentricity compensation is made. An eccentricity is compensated depending on a changed playback speed, in the event that the playback speed changes as in sections P3 and P4.

In FIG. 9, the series of digital pulses FG shows the output signal of the disc rotation detector 1010, the amplified tracking error signal TE shows the output signal of the RF amplifier 50, the signal DE shows an extracted eccentricity, and the signal EC shows a signal being compensated for an eccentricity.

While the present invention has been particularly shown and described with reference to preferred embodiments thereof, it will be understood by those skilled in the art that various changes in form and details may be made without departing from the spirit and scope of the invention as defined by the appended claims.

As described above, the optical disc player according to the present invention has advantages in that it can provide correct eccentricity compensation because it is not affected by phase delay of the tracking filter and can render eccentricity compensation of an eccentricity to be once extracted at a particular playback speed of a disc regardless of a playback speed.

What is claimed is:

1. An optical disc player, comprising:
    a spindle controller for rotating an optical disc;
    a pickup for reading information on the optical disc, the pickup having a focusing actuator and a tracking actuator;
    an RF amplifier for detecting and amplifying a focusing error signal and a tracking error signal from information on the optical disc obtained from the pickup;
    a focusing servo for controlling the focusing actuator in response to the amplified focusing error signal;
    a tracking servo for outputting a tracking control signal in response to the amplified tracking error signal; and
    an eccentricity compensator for outputting a signal which compensates for the eccentricity of an optical disc in response to the output signal of the spindle controller, the amplified tracking error signal and the amplified tracking control signal,
    the eccentricity compensator detecting the rotation period of the optical disc, producing a plurality of pulses using the detected rotation period, detecting an eccentricity included in the amplified tracking error signal according to the plurality of generated pulses and generating a compensating signal for the detected eccentricity;
    wherein the eccentricity compensator comprises:
        a disc rotation detector for outputting a series of digital pulses every rotation of the optical disc in response to the output signal of the spindle controller,
        a pulse signal generator for outputting first and second pulse signals in response to the series of digital pulses,
        an eccentricity controller for outputting an eccentricity control signal which indicates whether the eccentricity of the optical disc is to be compensated for,
        an eccentricity compensator unit for outputting an eccentricity compensation signal in response to the eccentricity control signal, the first pulse signal, the second pulse signal and the amplified tracking error signal, and
        an adder for combining the eccentricity compensation signal with the tracking control signal and transmitting the combined result to the pickup,
    wherein the eccentricity compensator unit comprises:
        a band-pass filter for receiving the amplified tracking error signal and removing at least one of DC components and noise therefrom;
        an eccentricity extraction and compensation unit for extracting and compensating for an eccentricity in response to the first pulse signal, the second pulse signal, the eccentricity control signal and the output signal of the band-pass filter, and
        a gain/phase controller for receiving the output signal of the eccentricity extraction and compensation unit and regulating the gain of the received signal and the frequency thereof,
    wherein the eccentricity extraction and compensation unit comprises:
        a one-rotation detector for outputting a one-rotation flag signal and an eccentricity compensating selection signal in response to the first pulse signal and the eccentricity control signal,
        a memory controller for outputting an address signal and a read/write signal in response to the eccentricity control signal, the second pulse signal and the one-rotation flag signal,
        a memory for selectively storing an eccentricity error which is the output signal of the band-pass filter and outputting the stored eccentricity error in response to the second pulse signal, the address signal and the read/write signal, and
        an eccentricity compensation selector for selecting at least one of the eccentricity error and a predetermined reference value according to the eccentricity compensation selection signal;
    wherein the compensating signal automatically changes in relation to the playback speed the optical disc.

2. The optical disc player according to claim 1, wherein the first pulse signal is generated at the falling edge or the rising edge of the received series of digital pulses, and wherein a plurality of pulses are generated in the second pulse signal for each pulse of the first pulse signal.

3. The optical disc player according to claim 1, wherein the one-rotation detector further receives a mute signal, mutes eccentricity compensation based on the mute signal, and maintains the phase of an eccentricity in preparation for the subsequent compensation.

* * * * *

UNITED STATES PATENT AND TRADEMARK OFFICE
CERTIFICATE OF CORRECTION

PATENT NO. : 6,714,492 B2
DATED : March 30, 2004
INVENTOR(S) : Jeong-hun Kim

It is certified that error appears in the above-identified patent and that said Letters Patent is hereby corrected as shown below:

Column 7,
Line 49, please insert -- of -- before "the".

Signed and Sealed this

Twenty-second Day of June, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,714,492 B2
DATED : March 30, 2004
INVENTOR(S) : Jeong-hun Kim

It is certified that error appears in the above-identified patent and that said Letters Patent is hereby corrected as shown below:

Column 8,
Line 49, please insert -- of -- before "the".

This certificate supersedes Certificate of Correction issued June 22, 2004.

Signed and Sealed this

Twenty-fourth Day of August, 2004

JON W. DUDAS
*Director of the United States Patent and Trademark Office*